(12) United States Patent
Saur et al.

(10) Patent No.: US 8,764,101 B2
(45) Date of Patent: Jul. 1, 2014

(54) LOAD BEARING PANEL MEMBER

(75) Inventors: Calvin A. Saur, West Bloomfield, MI (US); Robert L. Becker, Romeo, MI (US)

(73) Assignee: Century Plastics, Inc., Shelby Township, MI (US)

(*) Notice: Subject to any disclaimer, the term of this patent is extended or adjusted under 35 U.S.C. 154(b) by 196 days.

(21) Appl. No.: 13/494,174

(22) Filed: Jun. 12, 2012

(65) Prior Publication Data

US 2012/0244309 A1  Sep. 27, 2012

Related U.S. Application Data

(62) Division of application No. 11/370,414, filed on Mar. 8, 2006, now Pat. No. 8,221,673.

(60) Provisional application No. 60/691,790, filed on Jun. 17, 2005.

(51) Int. Cl.
  *B62D 33/00* (2006.01)
  *B62D 31/00* (2006.01)
  *B32B 5/12* (2006.01)
  *B29C 70/78* (2006.01)

(52) U.S. Cl.
  CPC . *B62D 31/00* (2013.01); *B32B 5/12* (2013.01); *B29C 70/78* (2013.01)
  USPC ............. 296/191; 425/97; 425/149; 425/190; 425/553; 425/591; 264/453; 264/454; 264/37.27; 264/37.33; 264/513; 264/515; 264/537; 264/297.2; 264/328.7; 264/328.18

(58) Field of Classification Search
  CPC ........... B32B 5/12; B29C 70/78; B62D 31/00
  USPC ............. 425/241, 250, 255, 50, 81, 478, 645, 425/297.2, 328.1, 328.8, 453, 57, 37.33, 425/513, 515, 537, 328.7, 328.183, 97, 149, 425/190, 533, 591; 296/191, 97.23
  See application file for complete search history.

(56) References Cited

U.S. PATENT DOCUMENTS 3,391,959 A * 7/1968 Stata ........................... 296/97.23
5,139,845 A * 8/1992 Beckerman et al. ........... 428/117
8,221,673 B2 * 7/2012 Saur et al. ...................... 264/573

FOREIGN PATENT DOCUMENTS

GB  2 227 035 A * 7/1990

* cited by examiner

*Primary Examiner* — Lori Lyjak
(74) *Attorney, Agent, or Firm* — Quinn Law Group, PLLC

(57) ABSTRACT

A load bearing panel member having a first portion, a second portion, and an appearance surface portion is formed by injection molding such that the first portion includes a plurality of rib members forming a grid pattern on the first portion and another plurality of rib members extending toward the periphery of the first portion which may be non-orthogonal to each other and to the rib members forming the grid pattern. A tubular cavity may be formed within each of the non-orthogonal rib members by injecting a gas into the rib member during the molding process forming the panel. An appearance surface portion attached to the first portion and second portion of the panel member forms an integral hinge between the first and second portions of the panel member. The panel member may be configured as a floor panel of a vehicle.

20 Claims, 3 Drawing Sheets

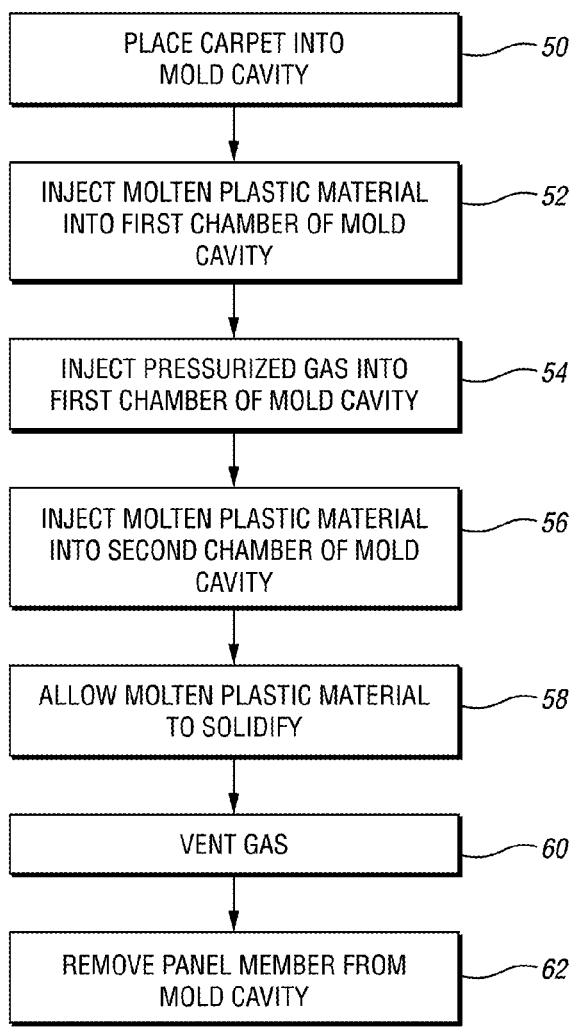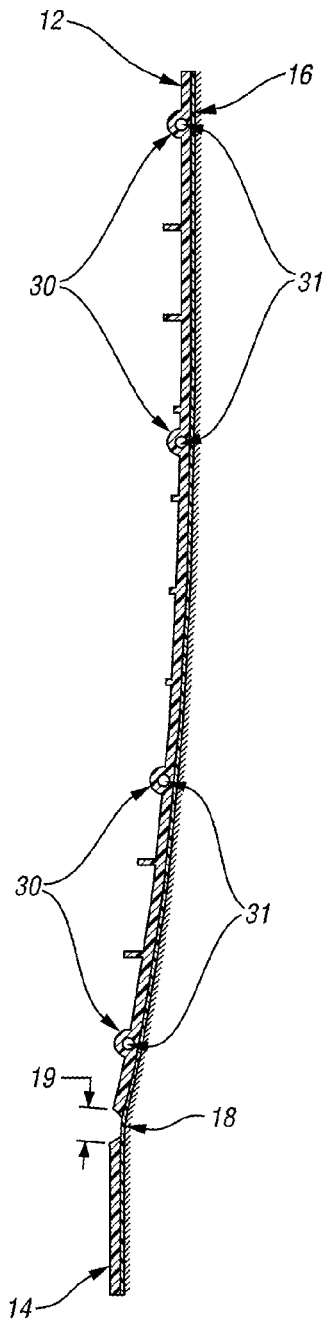
Fig. 2
Fig. 3

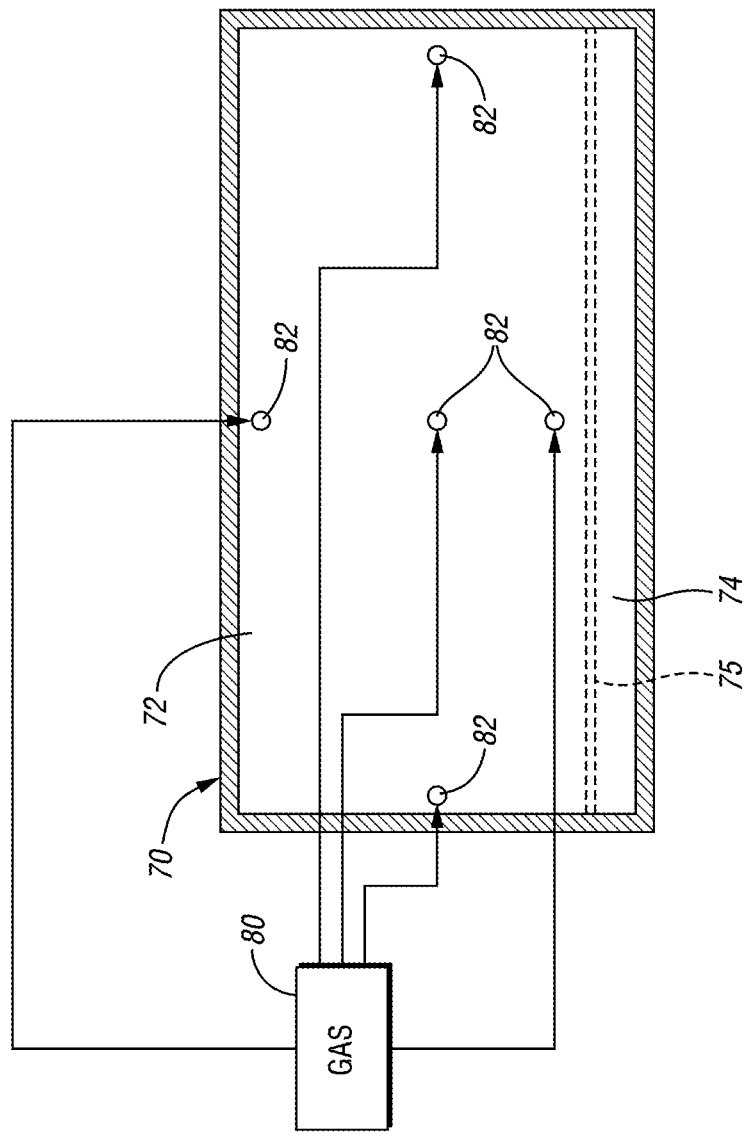
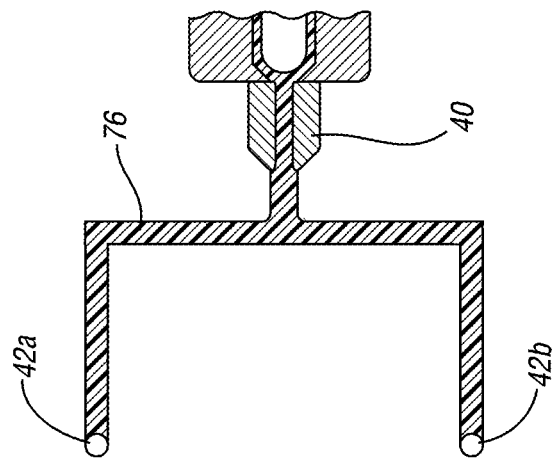
Fig. 4b
Fig. 4a

LOAD BEARING PANEL MEMBER

CROSS-REFERENCE TO RELATED APPLICATIONS

This application claims the benefit of U.S. Provisional Application No. 60/691,790 filed Jun. 17, 2005, and U.S. Non-Provisional application Ser. No. 11/370,414 filed Mar. 8, 2006, each hereby incorporated by reference in its entirety.

TECHNICAL FIELD

The present invention is drawn to a load bearing panel member formed by a method of injection molding.

BACKGROUND

There are numerous known systems for plastic injection molding. In conventional plastic injection molding systems, plastic pellets are melted in an injection molding machine and advanced by a screw ram through an injection nozzle and into a mold cavity. The mold cavity is preferably formed between two mold halves. The molten plastic material in the cavity is allowed to cool and harden in the cavity. When the plastic material has cooled and sufficiently hardened, the two halves of the mold are separated or opened and the part is removed, typically by one or more ejector pins.

Some injection molding systems utilize a gas in the injection molding process and are commonly known as "gas-assisted injection molding" systems. In these systems, the gas is injected into the molten plastic material through the plastic injection nozzle itself, or through one or more pin mechanisms strategically positioned in the mold. It is also possible to inject the gas directly into the molten plastic in the barrel of the injection molding machine. The gas, which typically is an inert gas such as nitrogen, is injected under pressure and forms one or more hollow cavities or channels in the molded part.

Gas-assisted injected molding produces a structure having a hollow interior portion which results in saving weight and material, thereby reducing costs. The pressurized gas applies an outward pressure to force the plastic against the mold surfaces while the article solidifies. This helps provide a better surface on the molded article and reduces or eliminates sink marks and other surface defects. The use of pressurized gas also reduces the cycle time as the gas is introduced and/or migrates to the most fluent inner volume of the plastic and replaces the plastic in those areas which would otherwise require an extended cooling cycle. The pressure of the gas pushing the plastic against the mold surfaces further increases the cooling effect of the mold on the part, thus solidifying the part in a faster manner and reducing the overall cycle time.

SUMMARY

The present invention provides a method for producing a structural or load bearing injection molded panel member. According to a preferred embodiment, the panel member is a floor panel for a van having retractable rear seats wherein the panel member is adapted to cover the rear seats when fully retracted and act as a load floor. The panel member preferably includes a first portion, a second portion and an interior surface portion. The present invention will hereinafter be described according to the preferred embodiment wherein the interior surface portion is a carpet material; however, it should be appreciated that according to alternate embodiments the interior surface portion could also include, for example, a vinyl material or a textile material.

The preferred method of the present invention includes placing the carpet material into a mold cavity configured to produce the panel member. The mold cavity preferably includes a first chamber adapted to form the first portion of the panel member, and a second chamber adapted to form the second portion of the panel member. After the carpet material is inserted into the mold, molten plastic material and pressurized gas are injected into the first chamber of the mold cavity. After the molten plastic material is injected into the first chamber of the mold, molten plastic material is injected into the second chamber of the mold cavity. A sequential gating process is used to achieve this sequence of operations. The molten plastic is then cooled until it solidifies. After the molten plastic is sufficiently cooled, the pressurized gas is vented and the panel member is removed from the mold.

It should be appreciated that the order in which the steps of the preferred embodiment are performed may be varied according to alternate embodiments. For example, according to one alternate embodiment of the present invention, the molten plastic material may be injected into the second chamber of the mold cavity before molten plastic material is injected into the first chamber of the mold cavity. According to yet another alternate embodiment, molten plastic may be injected into the first and second chambers of the mold cavity simultaneously.

The present invention also provides a structural or load bearing panel member and a product by process. The load bearing panel member preferably includes a generally rectangular first portion, a generally rectangular second portion, and a carpet material. The carpet material is attached to the first portion and the second portion such that the carpet material forms an integral or living hinge at a gap therebetween. The first portion of the panel member defines a plurality of solid horizontally disposed ribs and a plurality of solid vertically disposed ribs. The first portion of the load bearing panel member also includes a plurality of hollow ribs formed by the gas assisted injection molding process. The hollow ribs are generally located around the periphery of the first portion of the load bearing panel member as well as in an X-shape originating at the center of the first portion and extending toward the corners thereof. The solid ribs and hollow ribs are adapted to increase strength and rigidity and provide substantial structural or load-bearing capability The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 is a block diagram illustrating a method of the present invention;

FIG. 3 is a sectional view of the panel member taken along line A-A of FIG. 1;

FIG. 4a is a schematic sectional view of an injection molding nozzle and a plurality of valves; and FIG. 4b is a schematic plan view of a mold cavity.

DESCRIPTION

Figure 1:
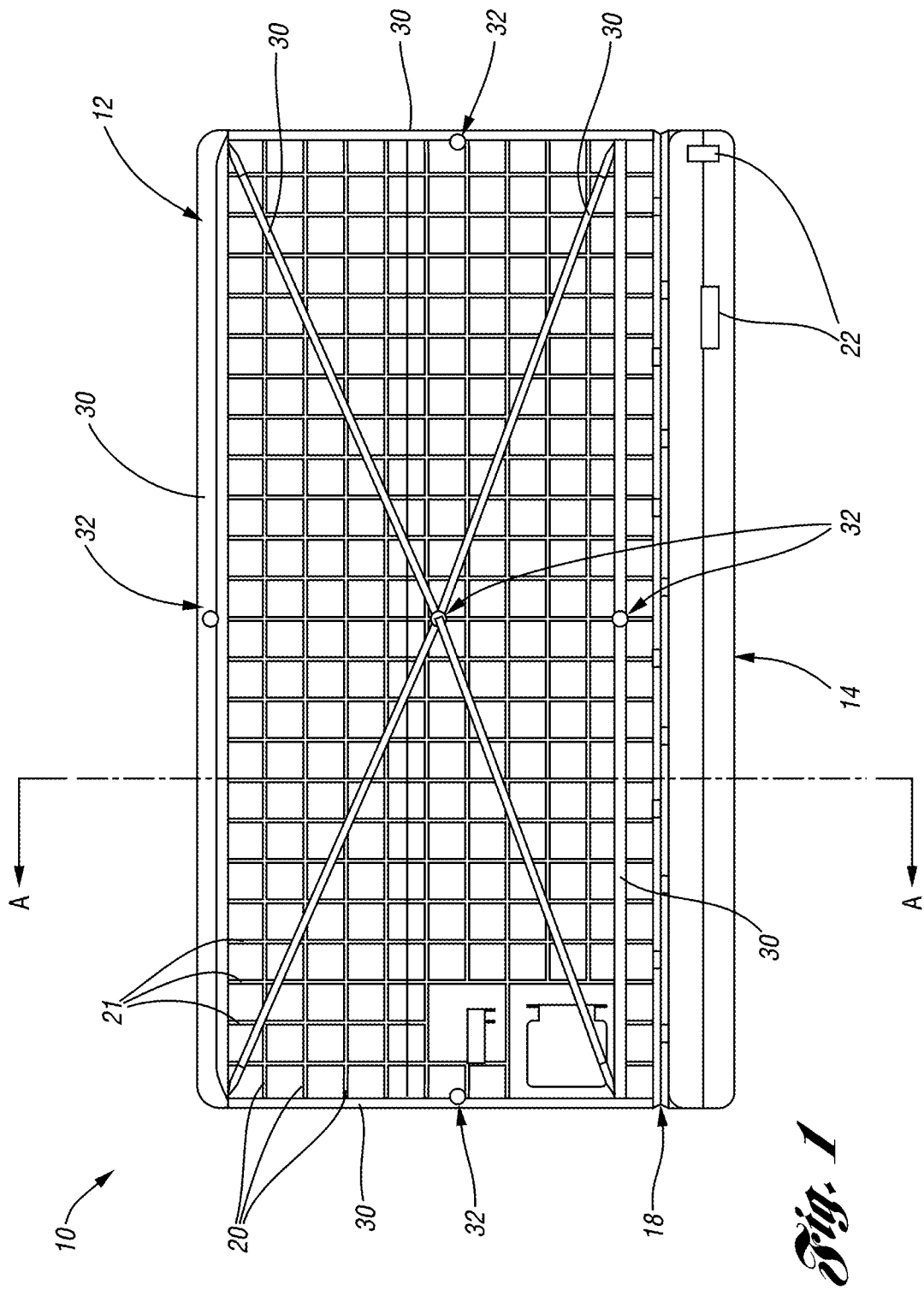
FIG. 1 is a bottom view of a load bearing panel member in accordance with the present invention.

Referring to the drawings, wherein like reference numbers refer to like components, FIG. 1 shows a panel member 10 produced according to a method of the present invention. The panel member 10 will hereinafter be described as a floor panel for a van having retractable rear seats (not shown), wherein the panel member 10 is adapted to cover the rear seats when the seats are fully retracted and also to act as a load floor. It should be appreciated, however, that the method of the present invention may be implemented to produce other conventional panel members as well.

The panel member 10 includes a generally rectangular first portion 12, a generally rectangular second portion 14, and an interior or appearance surface portion 16 (shown in FIG. 3). The present invention will hereinafter be described according to the preferred embodiment wherein the interior surface portion 16 is carpet material; however, it should be appreciated that according to alternate embodiments the interior surface portion 16 could also include, for example, a vinyl material or a textile material. According to a preferred embodiment, the carpet material 16 is a polypropylene material with a polyester backing. The carpet material 16 is attached to the first portion 12 and the second portion 14 such that the carpet material 16 forms an integral or living hinge 18 at a gap 19 between the first portion 12 and the second portion 14. The first portion 12 of the panel member 10 defines a plurality of solid horizontally disposed ribs 20 and solid vertically disposed ribs 21. The solid ribs 20 and 21 are normal to each other so as to increase strength and rigidity and provide substantial load-bearing capability. According to a preferred embodiment of the present invention, the second portion 14 of the panel member 10 includes a plurality of up-standing clip attach members 22.

The clip attach members 22 preferably each retain a metallic attachment clip (not shown) configured to mount the second portion 14 of the panel member 10 to a seat assembly (not shown). When the seat assembly is in an upright position, the hinge 18 allows the second portion 14 of the panel member 10 to fold underneath the first portion 12 and below the seat.

When the seat assembly (not shown) is fully retracted, the first portion 12 of panel member 10 is rotatable about the integral hinge 18 from an open position exposing the seat assembly to a closed position at which the seat assembly is covered. When the seat assembly is fully retracted and the first portion 12 of panel member 10 is in the closed position, the carpet material 16 (shown in FIG. 3) is exposed and the seat assembly is completely hidden. In this manner, the panel member 10 is adapted to provide an aesthetically pleasing carpeted interior when the seat assembly is retracted, and also provide substantial floor-strength.

Referring to FIG. 2, a method for manufacturing the panel member 10 according to the present invention is shown. At step 50, the carpet material 16 is placed into a mold cavity 70 (shown in FIG. 4*b*) configured to produce the panel member 10. Optionally, at step 50, metal inserts such as bars and/or tubes (not shown) can also be placed into the mold cavity 70 with the carpet material 16 to produce a panel member 10 with increased strength and rigidity. The mold cavity 70 of the present invention preferably includes a first chamber 72 (shown in FIG. 4*b*) adapted to form the first portion 12 of the panel member 10, and a second chamber 74 (shown in FIG. 4*b*) adapted to form the second portion 14 of the panel member 10. The first and second chambers 72, 74 are preferably separated by an insert or feature 75 (shown in FIG. 4*b*) configured to produce the integral hinge 18 (shown in FIG. 3). At step 52, molten plastic material 76 (shown in FIG. 4*a*) is injected into the first chamber 72 of the mold cavity 70. The molten plastic material 76 is preferably injected in a conventional manner, such as, for example, by a reciprocating screw type injection device (not shown), through an injector nozzle 40 (shown in FIG. 4*a*), through a valve gate 42*a* (shown in FIG. 4*a*), and into the first chamber 72 of the mold cavity 70.

At step 54, an inert gas 80 (shown in FIG. 4*b*) such as nitrogen is injected into the first chamber 72 of the mold cavity 70 (shown in FIG. 4*b*) through a plurality of gas pins 82 (shown in FIG. 4*b*) positioned at locations predefined by the desired locations of the hollow ribs 30. The gas 80 preferably does not mix with the molten plastic material 76, but takes the path of least resistance through the less viscous portions of the plastic melt. The molten plastic 76 is therefore pushed against the wall portions of the mold cavity 70, which forms channels 31 and produces the hollow ribs 30 (shown in FIGS. 1 and 3).

Referring to FIG. 3, a sectional view taken through section A-A of FIG. 1 is shown. It can be seen in FIG. 3 that the hollow ribs 30 define an internal Channel 31 through which the gas is injected. Referring again to FIG. 1, the gas 80 (shown in FIG. 4*b*) is preferably injected through the gas pins 82 (shown in FIG. 4*b*) into the first portion 12 of the panel member 10 at the gas injection locations 32. According to a preferred embodiment, the hollow ribs 30 are generally located around the periphery of the first portion 12 of the panel member 10 as well as in an X-shape originating at the center of the first portion 12 and extending toward the corners thereof. It has been observed that the hollow ribs 30 formed in the manner described increase the rigidity and strength of the first portion 12 of the panel member 10. The increased strength and rigidity is particularly advantageous for the preferred embodiment wherein the panel member 10 is implemented as a load bearing floor panel.

Referring again to FIG. 2, at step 56 molten plastic material 76 (shown in FIG. 4*a*) is injected into the second chamber 74 of the mold 70 (shown in FIG. 4*b*). The molten plastic material 76 is preferably injected through the injector nozzle 40 (shown in FIG. 4*a*), through a valve gate 42*b* (shown in FIG. 4*a*), and into the second mold chamber 74.

A sequential gating process is preferably implemented to perform previously described steps 52 and 56. Referring to FIGS. 4*a*-4*b*, the valve gates 42*a* and 42*b*, which are adapted to feed the first and second mold chambers 72, 74, respectively, are opened using the sequential gating process. In other words, the sequential gating process is implemented to control the timing of the gates 42*a*, 42*b* and to coordinate the operation of valve gate 42*b* with the operation of valve gate 42*a*. According to a preferred embodiment, the valve gates 42*a* and 42*b* are configured to open and close at a predetermined time. The predetermined time at which the valve gates 42*a* and 42*b* open and close is generally based on the needs of the specific part to be molded and type of material being used. Alternatively, the valve gates 42*a* and 42*b* may be opened and closed based on the position of a screw type injection device (not shown).

Referring again to FIG. 2, at step 58 the molten plastic material 76 (shown in FIG. 4*a*) that was injected into the first and second chambers 72, 74 of the mold cavity 70 (shown in FIG. 4*b*) at steps 52 and 56 is allowed to cool and solidify. Thereafter, at step 60, the pressurized gas 80 (shown in FIG. 4*b*) that was injected in to the first chamber 72 of the mold cavity 70 at step 54 is allowed to vent through the gas pins 82 (shown in FIG. 4*b*). At step 62, the finished panel member 10 is removed from the mold cavity 70.

It should be appreciated that the order in which the steps 50-62 of the preferred embodiment are performed may be varied according to alternate embodiments. For example, according to one alternate embodiment of the present invention, step 56 at which the molten plastic material 76 (shown in FIG. 4*a*) is be injected into the second chamber 74 (shown in FIG. 4*b*) of the mold cavity 70 (shown in FIG. 4*b*) may be performed before step 52 at which molten plastic material 76 is injected into the first chamber 72 (shown in FIG. 4*b*) of the mold cavity 70. According to yet another alternate embodiment, steps 52 and 56 may be performed simultaneously such that molten plastic 76 is injected into the first and second chambers 72, 74 of the mold cavity 70 simultaneously.

While the best modes for carrying out the invention have been described in detail, those familiar with the art to which this invention relates will recognize various alternative designs and embodiments for practicing the invention within the scope of the appended claims.

The invention claimed is:

1. A load bearing panel member comprising:
   a first portion including:
      a first plurality of rib members forming a grid pattern on the first portion;
      wherein the first plurality of rib members are configured as solid ribs;
      a second plurality of rib members positioned adjacent the periphery of the first portion;
      a third plurality of rib members extending toward the periphery of the first portion, wherein each of the third plurality of rib members is non-orthogonal to another of the third plurality of rib members and non-orthogonal to each of the second plurality of rib members;
      wherein a tubular cavity is defined within each of the second plurality of rib members and each of the third plurality of rib members;
   an appearance surface portion attached to the first portion of the panel member; and
   a second portion attached to the appearance surface portion such that the appearance surface portion forms an integral hinge between the first and second portions of the load bearing panel member.

2. The load bearing panel member of claim 1, wherein the appearance surface material is a carpet material.

3. The load bearing panel member of claim 1, wherein a span of the appearance surface material separates the first portion and the second portion.

4. The load bearing panel member of claim 1, wherein the second portion of the panel member includes a clip attach member configured to receive an attachment clip.

5. The load bearing panel member of claim 1, further comprising:
   a metallic insert configured to increase the rigidity of the load bearing panel member.

6. A load bearing panel member having a first portion, a second portion, and an appearance surface portion, the load bearing panel member being formed by the process of:
   inserting the appearance surface portion of the panel member into a mold cavity having a first chamber, a second chamber, and a mold feature configured to separate the first chamber and the second chamber such that the appearance surface portion spans the first and second chambers and the mold feature;
   sequentially opening a plurality of valve gates configured to control the transfer of molten plastic into the first and second chambers of the mold;
   transferring molten plastic into the first and second chambers of the mold according to the sequence dictated by the valve gates, wherein the transferring occurs without expelling plastic from one of the first and second chambers into the other of the first and second chambers to form a first plurality of ribs, a second plurality of ribs, and a third plurality of ribs;
   wherein the first plurality of ribs is formed orthogonally to the second plurality of ribs, and the third plurality of ribs are obliquely intersecting and non-orthogonal to the first and second plurality of ribs;
   injecting pressurized gas into the first chamber of the mold cavity and into each of the third plurality of ribs in a manner to form a generally cylindrical internal channel in each of the third plurality of ribs, wherein each of the generally cylindrical internal channels is in fluid communication with another of the plurality of generally cylindrical internal channels;
   cooling the molten plastic in first and second chambers; and
   venting the pressurized gas from the first chamber of the mold cavity.

7. The load bearing panel member of claim 6, wherein the first chamber and the second chamber are sufficiently separated by the mold feature during the molding process such that the appearance surface portion which spans the mold feature remains uncoated by molten plastic.

8. The load bearing panel member of claim 6, wherein the step of injecting pressurized gas includes injecting pressurized nitrogen gas.

9. The load bearing panel member of claim 6, wherein inserting the appearance surface portion of the panel member includes inserting an appearance surface portion composed of a carpet material.

10. A load bearing panel member for a vehicle comprising:
    a panel member including a first portion, a second portion, and an appearance surface portion;
    wherein:
       the first portion includes a first plurality of ribs and a second plurality of ribs;
       wherein the first plurality of ribs is formed orthogonally to the second plurality of ribs;
       the appearance surface portion is attached to the first portion of the panel member; and
       the second portion is attached to the appearance surface portion such that the appearance surface portion forms an integral hinge between the first and second portions of the panel member.

11. The load bearing panel member of claim 10, wherein the first portion further includes:
    a third plurality of ribs generally located around the periphery of the first portion.

12. The load bearing panel member of claim 11, wherein at least one of the third plurality of ribs defines a generally cylindrical internal channel.

13. The load bearing panel member of claim 10, wherein the first portion further includes a fourth plurality of ribs; and
    wherein the fourth plurality of ribs are obliquely intersecting and non-orthogonal to the first and second plurality of ribs.

14. The load bearing panel member of claim 13, wherein each of the fourth plurality of ribs defines a generally cylindrical internal channel.

15. The load bearing panel member of claim 14, wherein the generally cylindrical internal channel of a first one of the fourth plurality of ribs is in fluid communication with the generally cylindrical internal channel of a second one of the forth plurality of ribs.

16. The load bearing panel member of claim 14, wherein the generally cylindrical internal channel is formed by injecting pressurized gas into each of the fourth plurality of ribs during the molding process forming the panel member.

17. The load bearing panel member of claim 10, wherein the appearance surface material is a carpet material.

18. The load bearing panel member of claim 10, wherein the panel member is configured as a vehicle floor panel.

19. The load bearing panel member of claim 10, wherein the panel member in an installed position in the vehicle is configured to rotate about the integral hinge from an open position to a closed position.

20. The load bearing panel member of claim 10, wherein the panel member is configured to cover a retractable vehicle seat in a retracted position.

* * * * *